United States Patent [19]

Kornfeldt et al.

[11] Patent Number: 5,483,562
[45] Date of Patent: Jan. 9, 1996

[54] DEVICE FOR VOLUME DELIMITATION DURING WORK WITH CONTAMINATED PARTS

[75] Inventors: Anna Kornfeldt; Lars-Åke Körnvik; Lars Törnblom, all of Västerås, Sweden

[73] Assignee: Asea Brown Boveri AB, Vasteras, Sweden

[21] Appl. No.: 218,648

[22] Filed: Mar. 28, 1994

[30] Foreign Application Priority Data

Apr. 13, 1993 [SE] Sweden .................................. 9301218

[51] Int. Cl.⁶ ...................................................... G21F 5/00
[52] U.S. Cl. ........................ 376/287; 376/272; 376/313; 250/519.1; 220/9.1
[58] Field of Search ..................... 376/272, 260, 376/287, 313; 250/506.1, 507.1, 519.1; 588/16, 20; 220/6, 9.1, 4.16, 666; 383/2, 120

[56] References Cited

U.S. PATENT DOCUMENTS

| | | | |
|---|---|---|---|
| 2,432,025 | 12/1947 | Lorenz | 220/6 |
| 3,659,108 | 4/1972 | Quase | 250/506.1 |
| 4,353,391 | 10/1982 | Belmonte et al. | 376/272 |
| 4,638,166 | 1/1987 | Baudro | 376/287 |
| 4,818,472 | 4/1989 | Operschall et al. | 376/260 |
| 5,157,900 | 10/1992 | Kupersmit | 206/577 |
| 5,316,175 | 5/1994 | Van Romer | 220/9.1 |

FOREIGN PATENT DOCUMENTS

465236  8/1991  Sweden .

*Primary Examiner*—Daniel D. Wasil
*Attorney, Agent, or Firm*—Watson, Cole, Grindle & Watson

[57] ABSTRACT

The invention relates to a volume delimitation tank (1) for preventing or limiting contamination of the surrounding liquid medium when working with contaminated parts. The volume delimitation tank (1) comprises a sack or channel which constitutes at least the substantially vertical walls (1a–d) of the tank and is made of a material which is capable of being folded, which is radiation-resistant, and resistant to puncture. The walls (1a–d) can be provided with fold notches (27) to obtain a well-defined folding when, for example, lowering at least one wall portion (1a–d) for passing objects out of the tank (1). The walls (1a–d) of the tank (1) are arranged at a bottom part (9). Cleaning equipment (16) is arranged inside the tank (1) for continuous cleaning of the contained volume.

21 Claims, 10 Drawing Sheets

DEVICE FOR VOLUME DELIMITATION DURING WORK WITH CONTAMINATED PARTS

TECHNICAL FIELD

The present invention relates to a device, during work with contaminated parts, to prevent or limit contamination of a surrounding liquid medium, especially suitable for machining, such as repair or scrapping, of radioactive components from a nuclear reactor.

BACKGROUND ART, PROBLEMS

In nuclear reactors it has hitherto been common to store scrap and rejected parts in their present condition in the reactor pool associated with the reactor. The space in many reactor pools has therefore been reduced and compaction has begun to be applied.

It has also been normal practice to carry out repairs direct in the fuel or reactor pool, which has resulted in the water therein being contaminated. Consequently, after completed work, cleaning of large volumes of water and large areas is required.

Swedish patent publication 465 236 discloses a processing vessel for scrapping rejected parts. The vessel is composed of a bottom end plate and a casing which can be mounted on the bottom end plate and consists of one or more detachably connected shell sections, arranged one after the other. Outside the processing vessel there is arranged a sealable shipping container for decomposed scrap. This container is detachably joined to the processing vessel and is arranged to communicate with the interior of the vessel via a sealable sluice opening. The shipping container is connectible to a cleaning plant for cleaning of a medium located in the shipping container. The disadvantage of this device is that a transport flask, in which the scrap is to be stored, is arranged outside the processing vessel whereby the scrap must be moved out to this flask, and this movement out takes place by means of the shipping container. Further, the processing vessel, which is usually made of stainless steel, is large, heavy and,unwieldy, which is annoying particularly during transport and storage. The processing vessel is also difficult to clean since gaps and pockets are formed between the shell sections and since metal chips of the same material as the processing vessel will easily adhere to the surfaces thereof. The processing vessel is also expensive to manufacture.

SUMMARY OF THE INVENTION, ADVANTAGES

According to the present invention, contamination of the surrounding environment is prevented by the use of a volume delimitation tank. The tank is arranged, for example in the fuel or reactor pool of a nuclear reactor, such that the water in the tank has a sealed or at least limited connection with the surrounding pool water during the machining phase. The volume delimitation tank comprises a sack or channel which constitutes at least the substantially vertical walls of the tank and is made of a material which is foldable, radiation-resistant and resistant to puncture due to sharp objects. The material should produce little waste during scrapping and combustion. The material consists, for example, of a fabric, or a cloth or a plate, of strong plastic fibres which are organic or synthetic and have a high strength, for example polyethylene, where the fibres have a high molecular weight and a high degree of order. An example of such a material is the fibre called Dyneema, marketed by DSM High Performance Fibers B.V. and by Nippon Dyneema Ltd. Another example is the fibre called Spectra, marketed by Allied Signals. The material stated is, in the fabric and cloth design, permeable to water to a limited extent and can be used as such or be made Watertight by lamination, either in conventional manner or by means of calandering. To increase the strength of the cloth or the fabric, several layers can be laminated, thus obtaining a more or less stiff plate.

In addition to the sack or channel, the volume delimitation tank comprises a bottom part and support rods intended to support the sack or channel. The bottom part and the support rods can be made of the same material as the sack or the channel. The bottom part can either be made weak, that is, be made with only one layer of cloth or fabric, or be made stiff as the support rods, or of aluminum or of stainless steel. When using a sack, the bottom part can be integral with the sack or be arranged as a loose part therein. When using a channel, the lower part thereof is attached to the bottom part. When mounting the tank, support rods are arranged at at least the vertical walls of the tank such that these are distended, whereafter the tank is lowered into the pool and filled with water therefrom. When using a tank with walls of cloth or fabric, sinkers can be used which are arranged at, for example, the bottom part. The vertical walls of the tank are then folded out and the tank is arranged at the pool's edge. The tank is attached, for example, to a substantilly horizontal beam structure arranged at the pool edge with beams projecting over the pool. It is also possible to allow the tank to stand on the bottom of the pool.

Depending on the machining that is to be carried out, a suitable frame structure may possibly be lowered down into the tank. The bottom part may possibly be arranged in this frame structure. The frame structure may be provided with a platform for tools and positions for the objects that are to be machined. Disintegration of scrap and repair of objects, respectively, take place with the aid of remotely operated members which are operated from a work platform arranged on top of the pool. During scrapping, some type of cutting device is used, for example, whereafter the separated pieces of scrap are brought, by means of the same or some other remotely operated member, to a scrap stand arranged in the tank. The water in and outside the tank constitutes a radiation shield.

During such chip-forming machining where the particles are difficult to remove by means of conventional cleaning, that is, by flushing and slurry exhaustion, an inner sack is arranged in the tank. The inner sack is made of a water-transmitting material which suitably is inflammable. The inner sack is, for example, of the same material as that of which at least the vertical walls of the tank are made. The inner sack is attached to the tank wall and the bottom part, by, for example, lines and loops, before the tank is lowered down into the pool. When dismantling, the inner sack is raised at such a speed that the water has time to pass out through the limiting surfaces of the sack. To accelerate the emptying, a pump can be arranged to pump out the water from the inner sack via the cleaning plant. Thereafter, the inner sack is burnt and the ashes passed to ultimate storage.

The tank can be connected to a cleaning plant for continuous cleaning of a medium located in the tank. After completed work, the entire enclosed volume of water is cleaned. When cutting methods have been used, the bottom part is slurry-exhausted to capture chips or the like. Objects which are lifted out of the tank are possibly flushed clean. Thereafter, the tank can be opened wholly or partially to insert new objects which are to be machined. This opening of the tank can take place in several ways (see the embodiments below).

The tank may possibly be provided with a sluice so that it can be used repeatedly without the entire enclosed water volume having to be cleaned (see the embodiments below).

When the tank is not used, it is dismantled and stored at some other location. All loose parts, such as tools, are flushed clean and raised from the tank whereupon the frame is raised, flushed clean and dismantled. Also the tank walls and the supports are flushed as they are raised and dismantled. Where necessary, the bottom part is slurry-exhausted. Any final cleaning is carried out in the reactor hall belonging to the pool, whereupon the parts are packed for storage or transport.

The invention offers many advantages. The foldable and light material in at least the walls of the tank contributes to a small space requirement and to a considerable simplification of transport, installation and storage. Since the tank is relatively inexpensive to manufacture in combination with its small space requirement when not being used, it is possible to use several tanks of different sizes and shapes in parallel. In this way a volume, which is suitable in relation to the size and shape of the object in question, can be simply delimited, which permits repair and scrapping of contaminated parts to be made in a not unnecessarily small/large delimited volume. The volume delimitation tank made of a plastic material permits a construction without gaps and pockets, which makes it easy to clean. Further, it is an advantage to have a tank of plastic material since the chips are hydrophilic whereas the tank is hydrophobic, which prevents the scrap particles from adhering to the tank and further facilitates cleaning. It is also an advantage that the tank can be made so large that the scrap container can be arranged inside the tank, thus avoiding sluices for sluicing out scrap parts. The tank can be made wholly of plastic. After scrapping and combustion, the tank produces little waste. In comparison with other materials, a fabric, a cloth or a plate of a suitable fibre is strong and is not essentially damaged by falling objects or by abrasion. The friction between the fibres is low, which permits the fabric to be folded in a simple manner. The light material in the tank means that the tank has a low weight, which in turn entails a considerable simplification of suspension devices and lifting tools for the tank.

BRIEF DESCRIPTION OF THE DRAWINGS

With reference to the accompanying drawings, a number of embodiments of a volume delimitation tank according to the invention will be described.

DESCRIPTION OF THE PREFERRED EMBODIMENTS

Figures 1A, 1B:
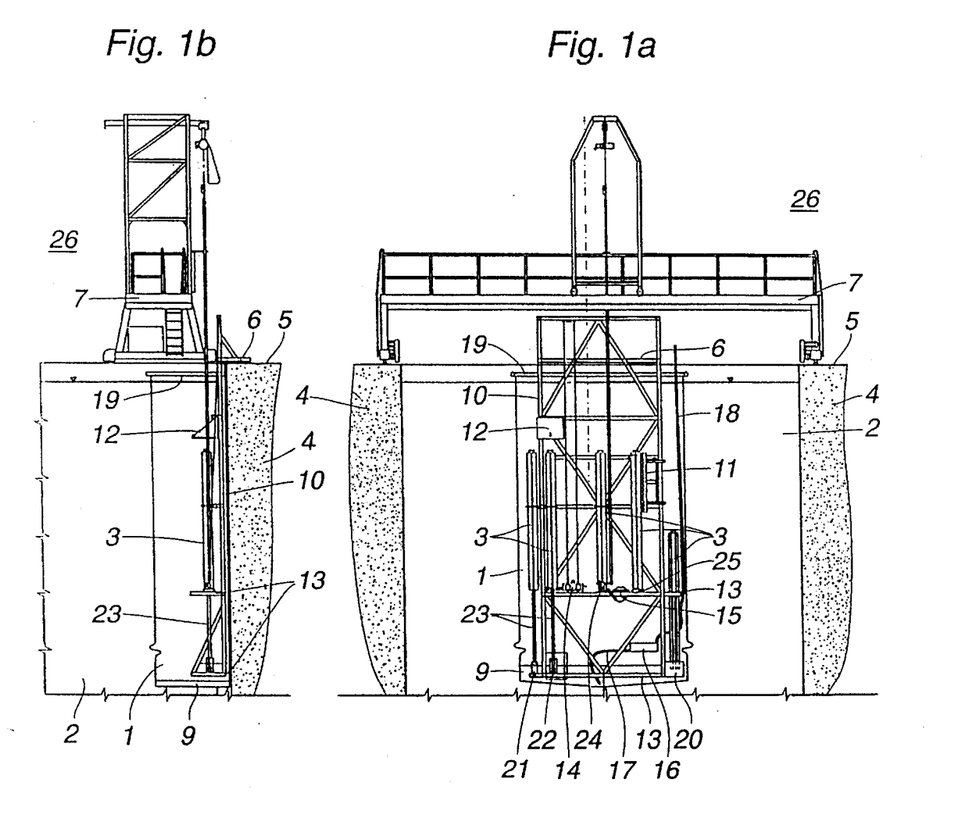
FIGS. 1a–c schematically show a volume delimitation tank according to the invention with a square cross section, arranged in a fuel pool or a reactor pool. The volume delimitation tank is shown in cross section (FIG. 1c), in a view from the side (FIG. 1b), and in a view from above (FIG. 1c).
Figure 1C:
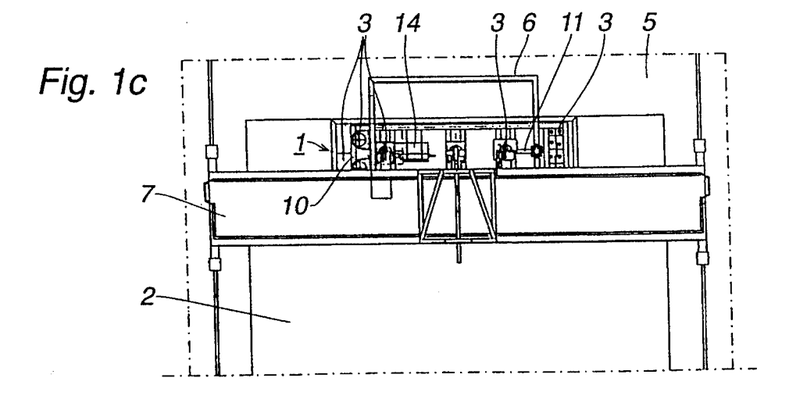

FIGS. 1a–c show a volume delimitation tank 1 according to the invention immersed into a fuel pool or a reactor pool 2. The shown tank 1 is intended to be used for scrapping control rods 3. In FIGS. 1a–c, the numeral 4 designates the protective concrete around the fuel or reactor pools 2 in the reactor building. The tank 1 is arranged suspended in the pool 2 and is attached to the edge 5 of the pool in a beam structure 6. The tank 1 substantially comprises vertical walls 1a–d shaped to form a channel and a box-shaped bottom part 9 for capturing debris. The tank 1 may, for example, have a height of 10 meters and the bottom part 9 may, for example, have an area of 5×3 meters. Inside the tank 1 there is a frame structure 10 for suspension of tools, such as a first spark machining device 11 and a gas hood 12. The frame structure 10 is also provided with two platforms 13 for the arrangement of tools such as a second spark machining device 14, a plugging device 15 and with machining positions for the objects which are to be machined. At the bottom of the tank 1, a cleaning device 16 is arranged, with an inlet conduit 17 and an outlet conduit 18 for continuously cleaning the contained volume.

When scrapping control rods 3, the volume delimitation tank 1 is used, for example, in a work cycle as follows:

1. Divisible support rods 19 intended to support at least the vertical walls 1a–d of the tank 1 are mounted. The walls 1a–d formed of a channel are arranged at the bottom part 9, whereafter the support rods 19 are arranged at the walls 1a–d. The size of the tank 1 is chosen according to the size of the object to be machined or according to other needs, such as the size of the machining equipment. As clearly shown in FIGS. 2a and 3a, the tank has an open top through which, as seen in FIGS. 1a and 1b, control rods 3 can be inserted and can be clearly viewed from above, when carrying out the invention.

2. The volume delimitation tank 1 with the support rods 19 and the bottom part 9 are lowered into the pool 2, whereby the tank 1 is filled with water from the pool. The vertical walls 1a–d of the tank 1 unfold or form folds. The tank 1 is arranged at the beam structure 6 with substantially horizontal beams 7 projecting over the pool 2.

3. The divisible frame structure 10 is mounted and provided with two platforms 13 for tools. The frame structure 10 is lowered into the tank 1 and arranged at the beams 6 on the pool edge 5. The tank 1 may be attached to the frame structure 10 instead of being attached to the beams 6, or both to the beams 6 and to the frame structure 10.

4. The remotely operated tools which are used for the machining are lowered down into the tank 1 and arranged at a suitable location at the frame structure 10. A scrap stand 20 for scrapped control rods 3 is arranged at the frame structure 10.

5. The control rod/rods to be scrapped is/are moved into the tank and arranged in a machining position or in a waiting position 21.

6. The scrapping operation is started whereby control rods 3 are transferred one at a time, by means of a remotely operated gripping tool (not shown), to a first machining position, a cutting position 22 where the shafts 23 of the control rods are cut off by means of the second spark machining device 14. Gases which may then leak out from the control rod 3, such as tritium and/or deuterium, are evacuated continuously via the openable gas hood 12. The shaft 23 is brought to the scrap stand 20, whereafter the hole left in the control rod 3 by the shaft 23, by means of the plugging device 15 in a second machining position 24, is plugged up to prevent further gas leakage. After the plugging, the control rod 3 is brought to a third machining position 25 where two opposed control rod blades of the cruciform control rod 3 are dismantled by means of the first spark machining device 11, whereafter they are arranged together with the non-dismantled control rod blades in the scrap stand 20. The work in the separate positions 22, 24, 25 can take place in parallel. The water is cleaned continuously during the entire work cycle by means of the cleaning device 16, which admits water via the inlet conduit 17 from the lower part of the tank, as well as at the spark gaps, that is, at the first and the second spark machining device 11, 14 (not shown), and cleans this water whereafter the water is returned to the tank 1 by way of the outlet conduit 18. The advantage of continuous cleaning is that the activity level in the water is kept low while at the same time the time for cleaning the total volume after completed work is considerably reduced.

7. After completed work, the entire contained volume is cleaned. In those cases where cutting methods have been used, the bottom part 9 is possibly slurry-exhausted to capture chips. Then the tank 1 is opened wholly or partially to insert new control rods 3 or other objects. When the scrap stand 20 is full, it is lifted, possibly after flushing, out of the tank 1 and is arranged in a transport flask (not shown) for transport to a storage for ultimate radiative waste disposal.

8. When no more objects are to be machined, all loose parts, such as tools, are flushed clean and are then lifted out of the tank 1, and then the tank 1 is dismantled. The frame structure 10 is flushed clean and is dismantled as it is being lifted up, the walls 1a–d are also flushed clean as they are being lifted up. The bottom part 9 is slurry-exhausted if necessary. Any final cleaning is carried out in the reactor hall 26 associated with the fuel or reactor pool 2, and the parts are packed for storage or transport. The FIGS. 2–8 of the drawings described in the following show examples of different embodiments of the tank 1 and how this is open or openable for moving objects into/out of the surrounding pool 2.

Figure 2A:
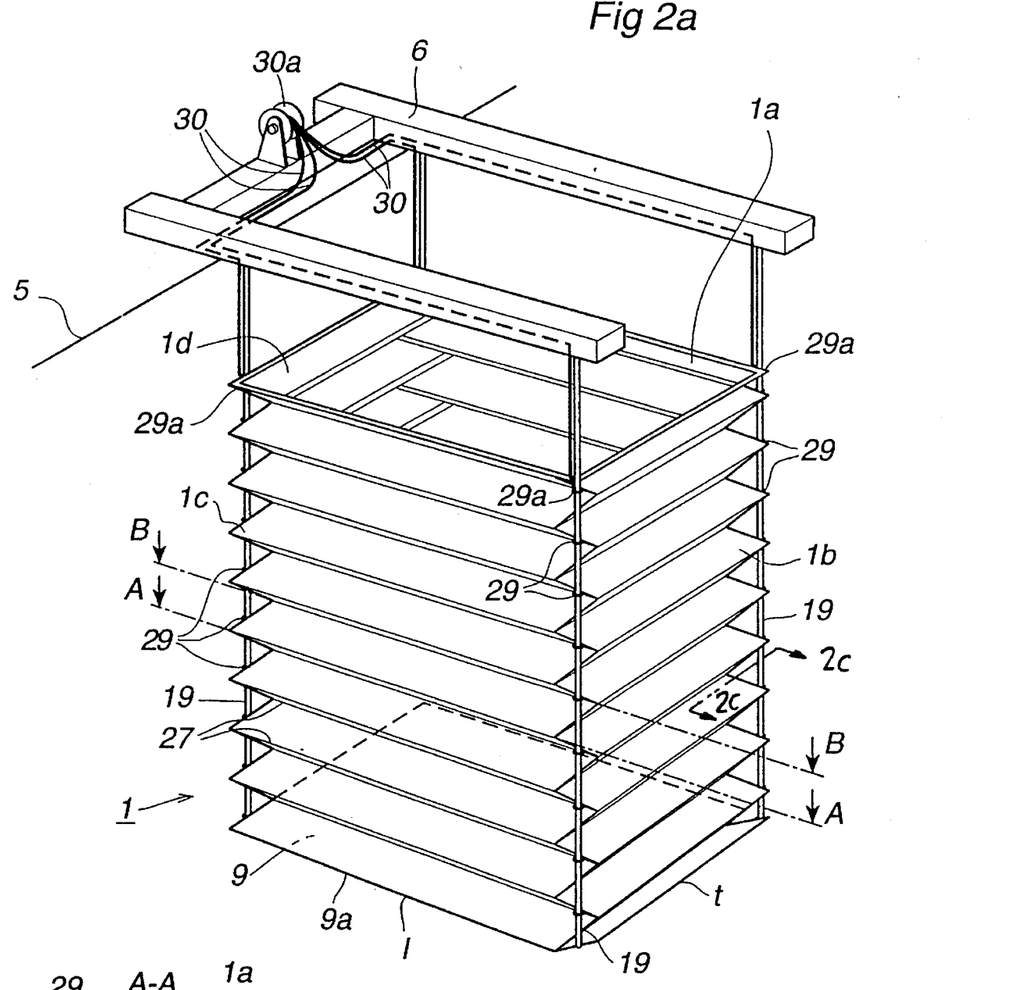
FIG. 2a schematically shows a volume delimitation tank with a square cross section and with an integrated bottom plate and with fold notches provided in the walls and where the walls of the tank are in a somewhat folded position.
Figures 2B, 2C:
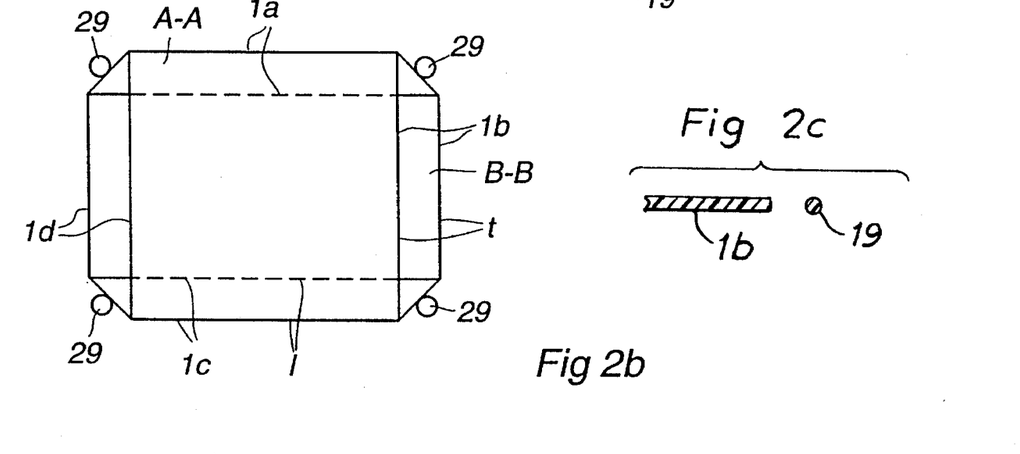
FIG. 2b shows in a view from above how the walls of the tank are arranged when being folded.
FIG. 2C is a sectional view, at an enlarged scale, taken substantially along the line 2C—2C of FIG. 2a illustrating a typical material of the tank side walls and support rod.

FIG. 2a shows a volume delimitation tank 1 of a woven material which, in order to obtain a well-defined folding of at least the vertical walls 1a–d of the tank, is provided at the manufacturing stage with fold notches 27 at specified intervals. The fold notches 27 can be achieved by weaving in a coarser thread at the notches 27 during manufacture. The tank 1 is formed as a sack with an integrated, possibly stiff square bottom part 9 and with four wall sections 1a–d. Each wall section 1a–d is cut and joined together to the next one such that the walls 1a–d, when being lowered, are folded in a well-defined and predetermined way. From FIG. 2b it is clear that the folding takes place such that every other folded section in a horizontal cross section A—A in one fold increased in the longitudinal direction 1 whereas every other folded section in a horizontal cross section B—B in an adjacent fold increases in the transverse direction t. To control the raising and lowering of the walls 1a–d, loops 29 are provided which run around the support rods 19 which distend the tank 1 at its corner portions. Ropes 30 are connected to at least the uppermost loops 29a to raise the lower the walls 1a–d. The ropes 30 run along the support rods 19 to the beam structure 6 and then along this beam structure to a pulley 30a. The tank in the figure is not entirely distended. The tank 1 is suspended from the beam structure 6 which rests on the edge 5 of the pool. Loops 29 and ropes 30 are preferably made of the same fibres as the walls 1a–d of the tank 1.

Figure 3A:
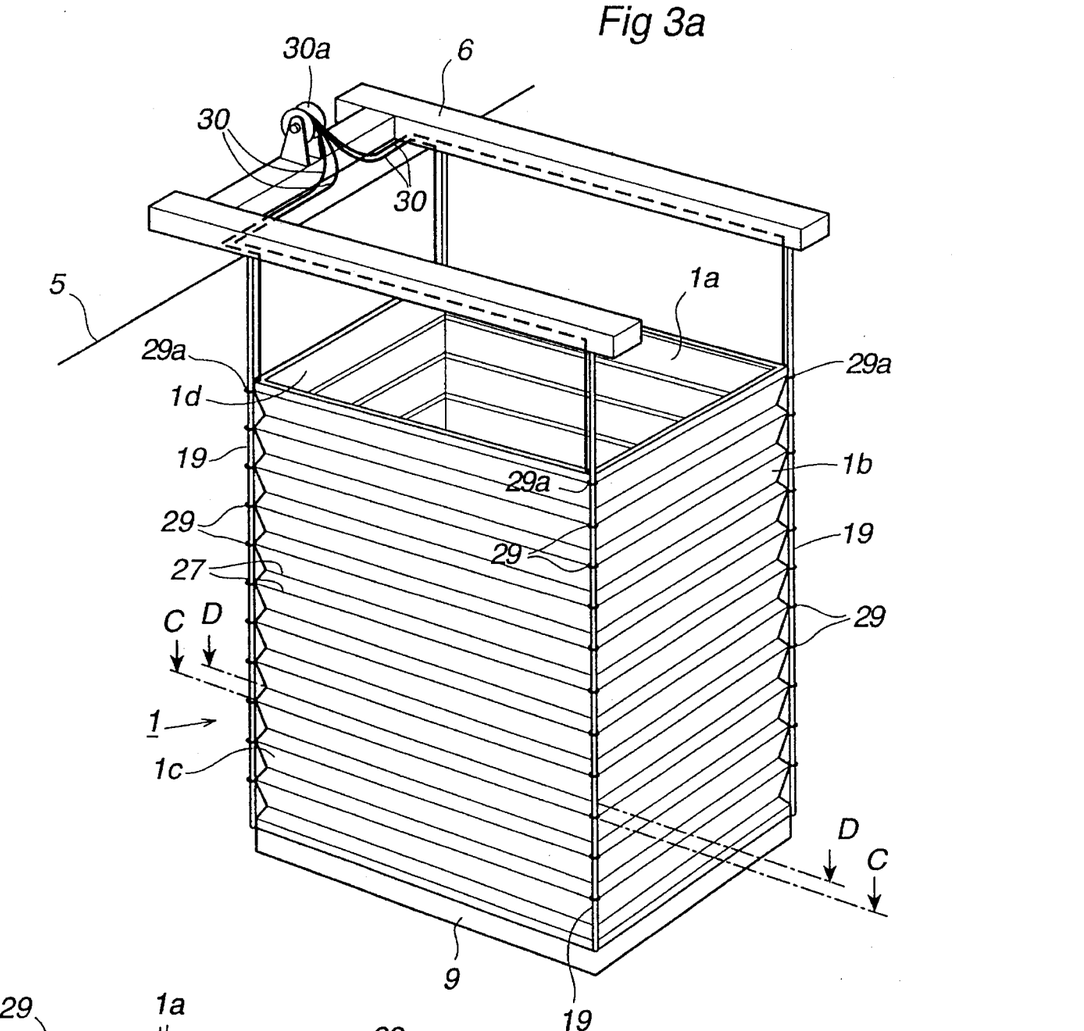
FIG. 3a schematically shows a volume delimitation tank with a square cross section and with a sepatate bottom plate and with fold notches, provided in the walls, of another type than those shown in FIG. 2. The walls of the tank are in a somewhat folded position.
Figure 3B:
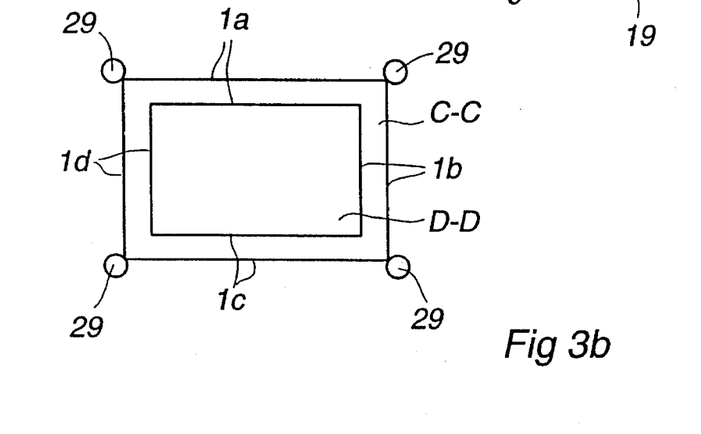
FIG. 3b shows in a view from above how the walls of the tank are arranged when being folded.

FIG. 3a shows a tank 1 with walls 1a–d which, as in FIG. 2, are provided with woven-in fold notches 27. In the same way as the tank 1 shown in FIG. 2, this tank 1 is provided with support rods 19 and loops 29 at the corner portions to control the raising and lowering of the walls 1a–d. In the same way as in FIG. 2, ropes 30 are arranged at at least the upper loop 29a in each corner portion for raising and lowering. From FIG. 3b it is clear that when the walls 1a–d are to be lowered, the folding takes place such that every other folded section in a horizontal cross section C—C in one fold is given a larger cross-section area than a horizontal cross section D—D in an adjacent fold. The tank 1 is suspended from the beam structure 6, which rests on the pools' edge 5.

Figure 4A:
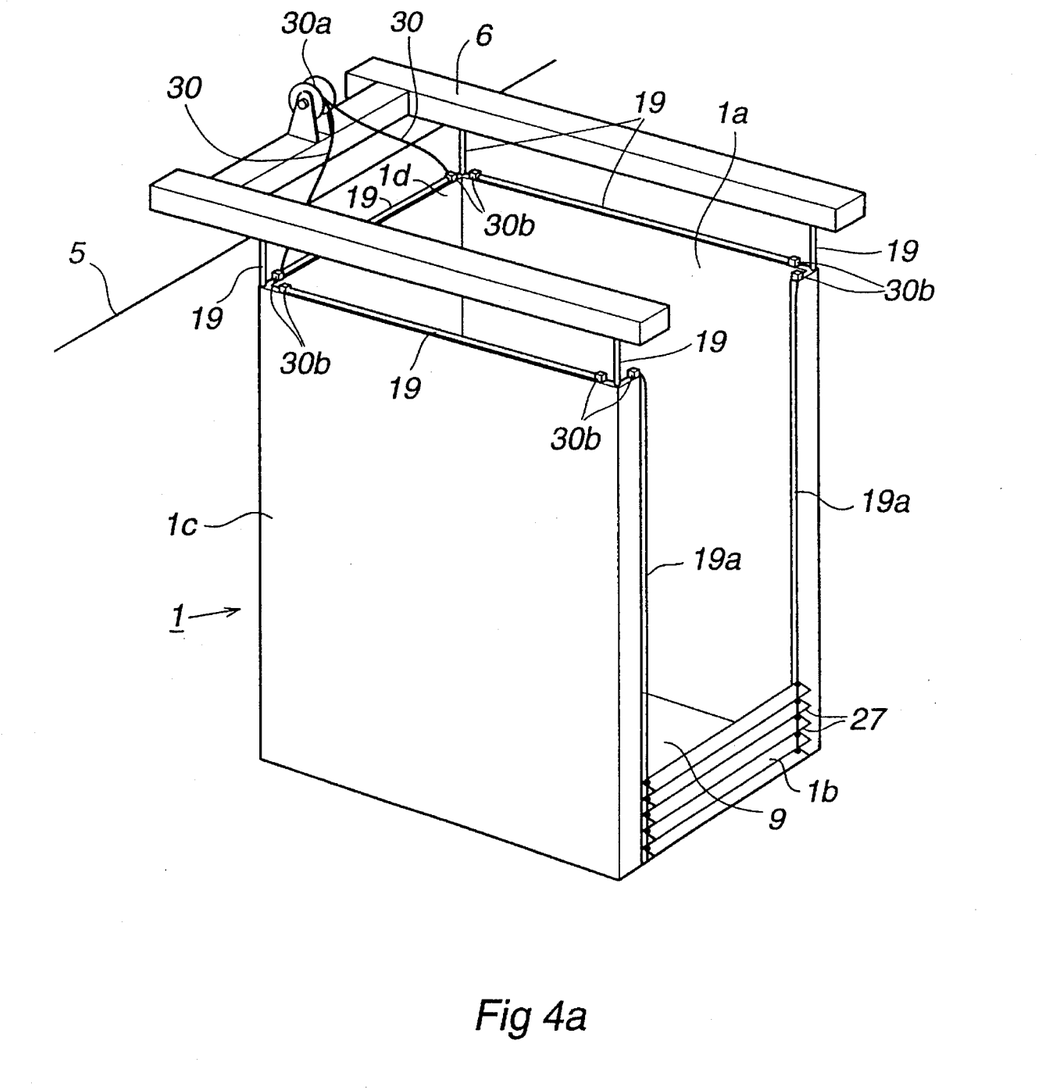
FIG. 4a schematically shows a volume delimitation tank with a square cross section, in which one wall portion is raisable and lowerable by providing the wall portion with fold notches and making it foldable.
Figure 4B:
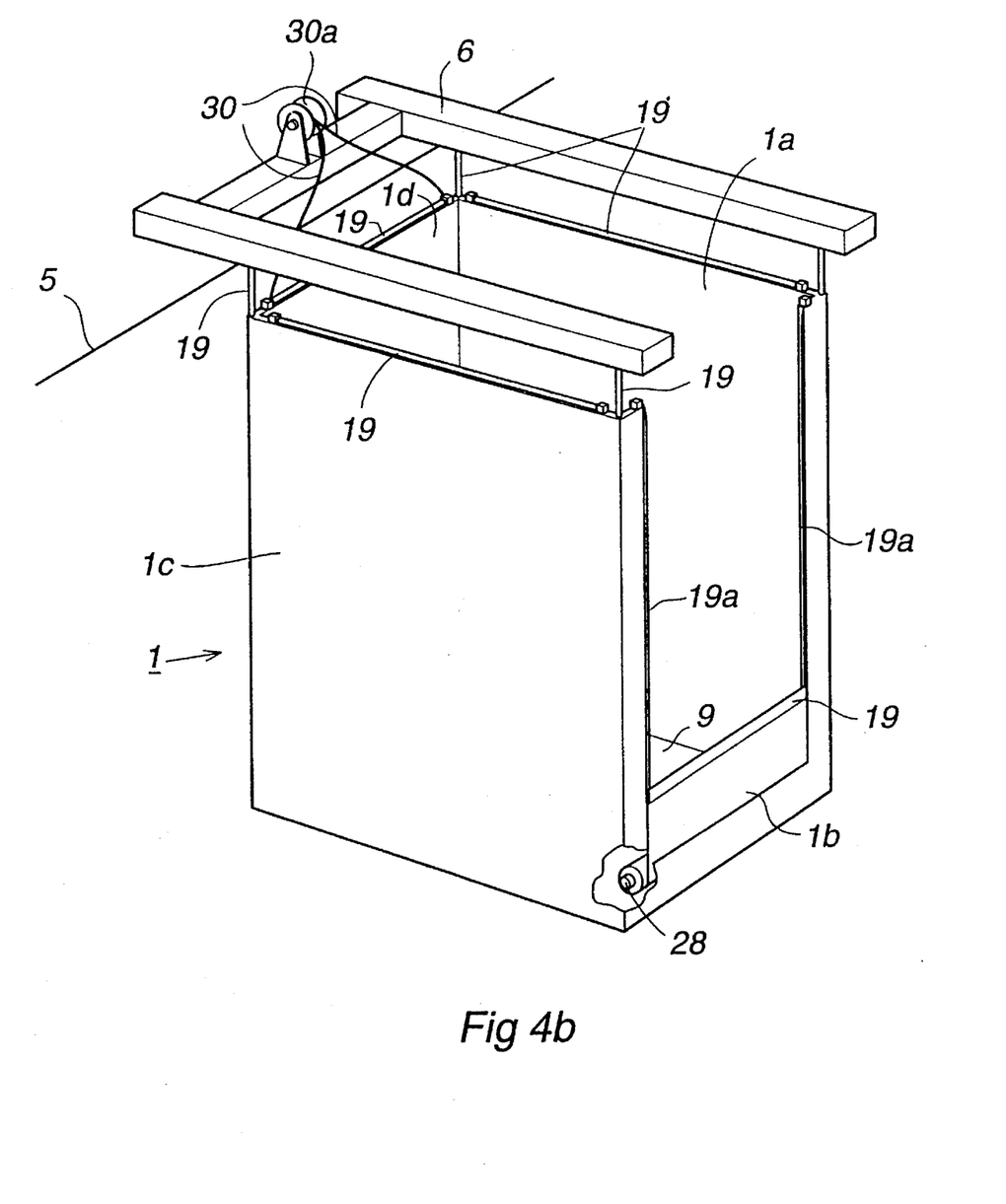
FIG. 4b shows a corresponding tank where the wall portion is raisable and lowerable by being arranged around a shaft for rolling off and on. The non-raisable and non-lowerable wall portions of the tank are shown in distended position.
Figure 5:
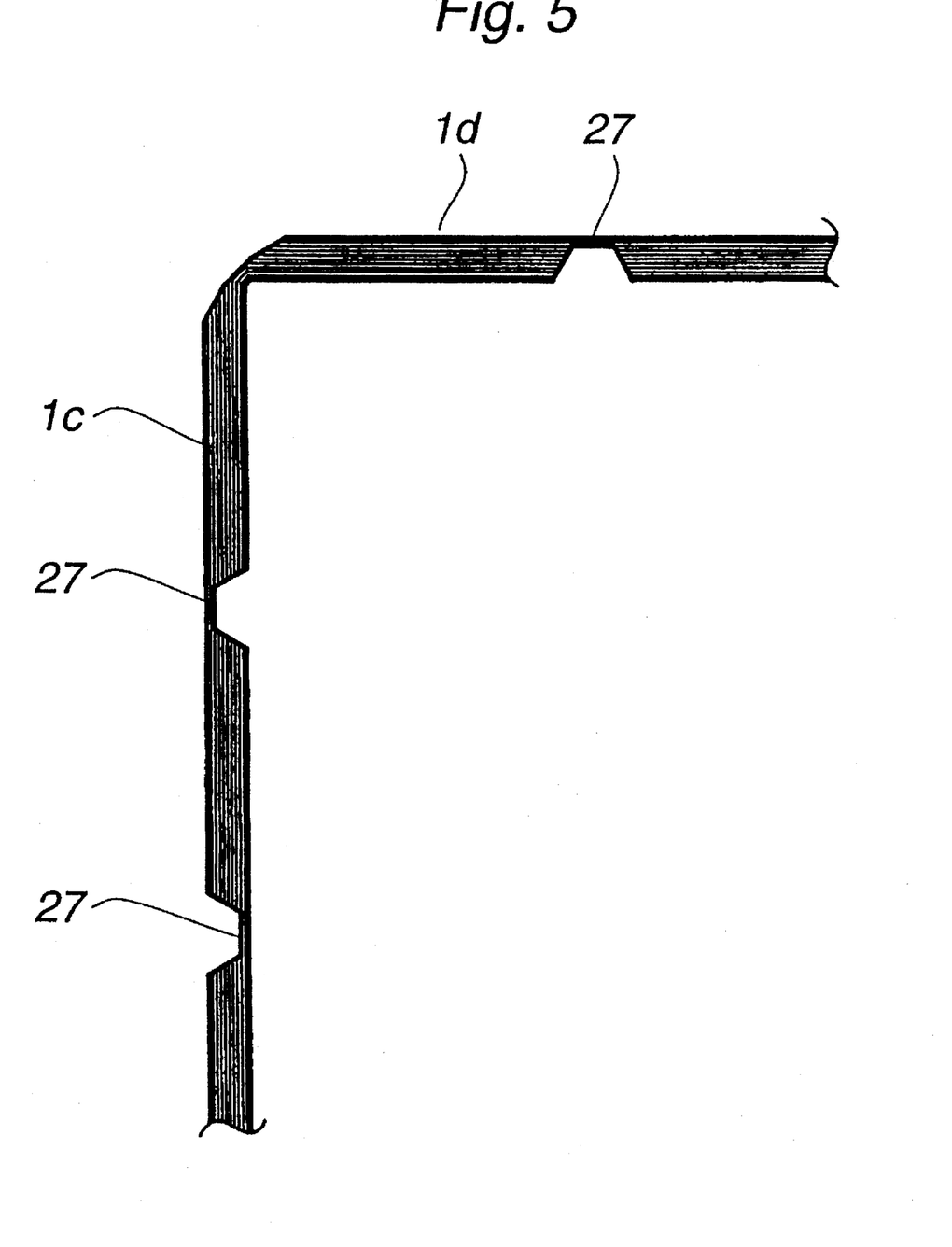
FIG. 5 schematically shows how a wall portion can be made stiff where necessary by limination of several layers of fabric/cloth, but provided with fold notches comprising, for example, one or two layers of fabric/cloth, is still foldable and can be used in a volume delimitation tank according to, for example, FIG. 4.

FIGS. 4a and 4b show a volume delimitation tank 1 in which at least one wall section 1b is separately raisable and lowerable. This is advantageous for repeated use, whereby not all walls 1a–d need be lowered to move objects in and out, respectively. Depending on the nature of the contamination, point exhaustion can be used during the machining; alternatively, chips can be sucked up from the bottom part 9 after completed work, and it is then not necessary that the whole volume of water be cleaned before lowering the wall portion and moving objects in/out. The non-separately raisable and lowerable walls 1a, 1c and 1d may be made of cloth, fabric or plate, by plate being meant two or more layers of laminate of cloth or fabric, of a suitable fibre. When the walls 1a, 1c, 1d are made of cloth or fabric, support rods 19 are arranged at at least the corners of the tank 1, and preferably also at the upper part thereof. When such a tank 1 is dismantled, the walls 1a, 1c, 1d are allowed to buckle arbitrarily. When the walls 1a, 1c, 1d are made of a stiff plate, they may be provided with fold notches 27, as is clear from FIG. 5, such that the walls can be folded into a suitable size. The separately raisable and lowerable section 1b can either be made of fabric with woven-in fold notches 27, as shown in FIG. 4a, or of fabric or cloth which is rolled off and onto a shaft 28 which may be arranged horizontally or vertically (not shown in the figure). The ropes 30 are adapted to raise and lower the wall section 1b. The ropes 30 run via pulleys 30b to the pulley 30a. One end of the shaft 28 may be provided with a motor (not shown) for rolling on and off. The section 1b runs along the vertical support rods 19a. When the section 1b is arranged in raised position, the tank 1 is sufficiently tight to the surrounding medium. If additional tightness to the surrounding medium is desired, sub-atmospheric pressure of sufficient magnitude is arranged in the tank for the separately raisable and lowerable wall section 1b to fit tightly against the support rod 19a, any leakage being directed inwards towards the contaminated volume.

Figure 6A:
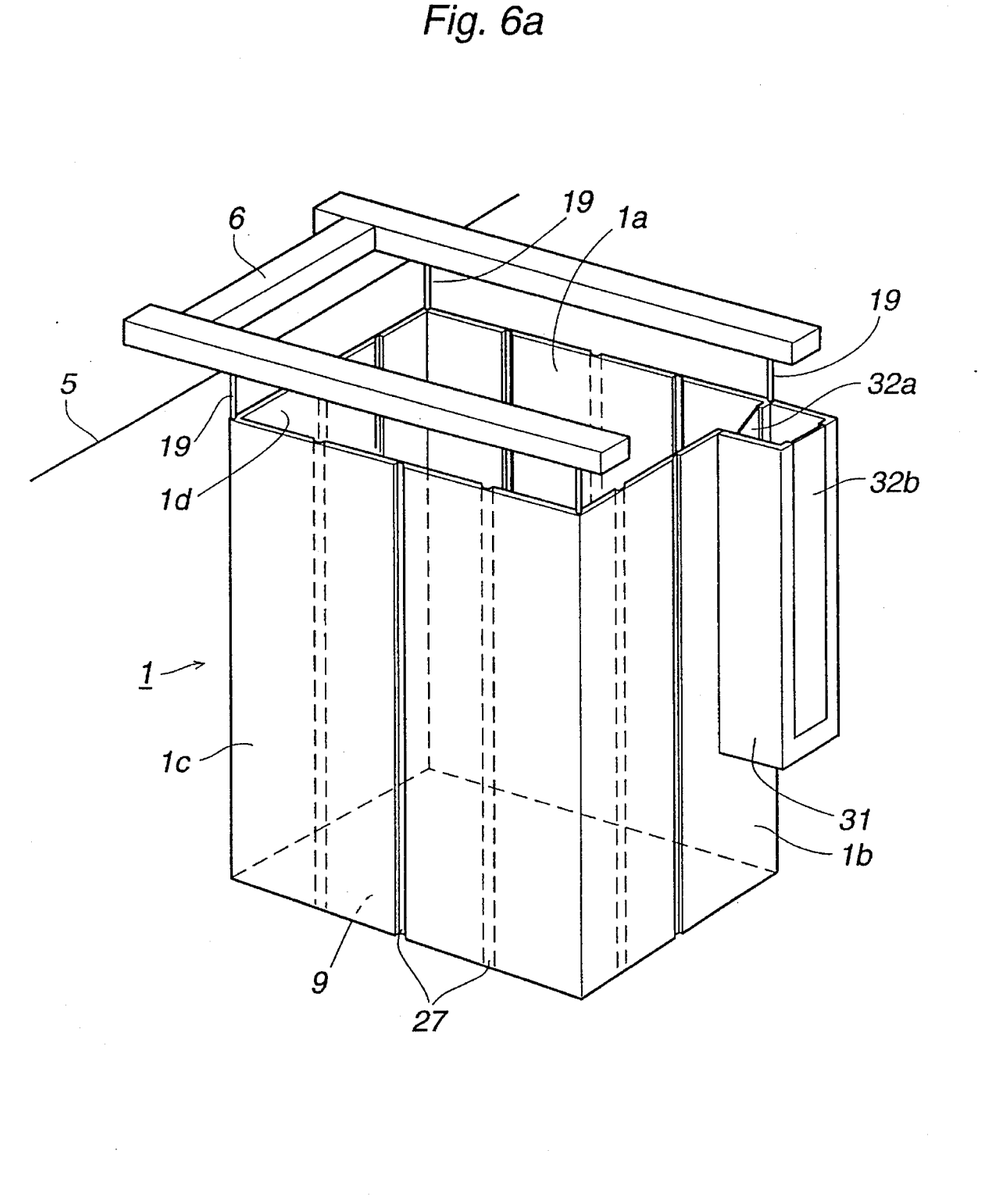
FIG. 6a schematically shows a volume delimitation tank with a square cross section and with a sluice provided at one wall for moving objects in and out.
Figure 6B:
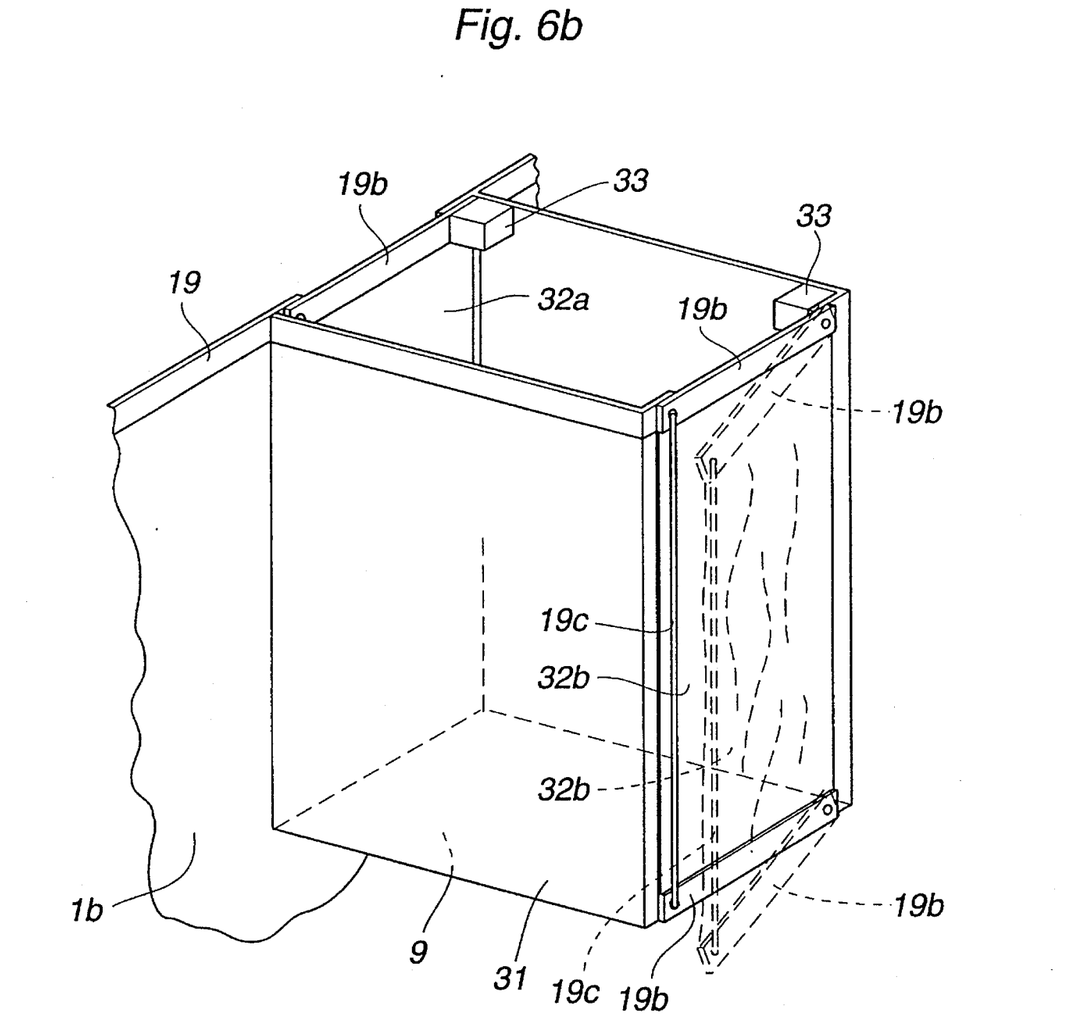
FIG. 6b schematically shows an alternative embodiment of the sluice. The walls of the tank are stiff and provided with fold notches according to FIG. 5.

FIGS. 6a and 6b show an embodiment with a sluice 31. The use of a sluice 31 is especially advantageous with repeated use of the tank 1 since the sluice 31 only requires cleaning of a small volume of water when moving objects in and out. The walls 1a–d and the sluice 31 are made of cloth, of fabric, or of a plate. In FIG. 6a, an object is sluiced out by opening the inner sluice-gate 32a, towards the sluice 31, the sluice-gate 32a being preferably made of a stiff plate where the opening takes place by remote operation from the work platform 7. Objects are introduced into the sluice 31 and the inner gate 32a is shut. The water in the slucie 31 is cleaned by means of the cleaning equipment 16 arranged in the tank 1 and the object is possibly flushed before the outer sluice gate 32b is opened towards the pool 2 to pass out the object thereto. If additional tightness to the surrounding medium is desired, sub-atmospheric pressure of sufficient magnitude is arranged in the sluice 31 for the sluice-gates 32a–b to fit tightly.

FIG. 6b shows sluice-gates 32a–b made of cloth or fabric, expanded by means of an upper and a lower support rod 19b which, in turned-up position, are substantially horizontal and parallel and which are interconnected, at least at the openable long side, via a substantially vertical support rod 19c. When opening the sluice-gate 32a–b, the support rods 19b are turned down (or up) in the vertical direction by means of a turning device 33 which is remote-controlled from the work platform 7, the cloth surface or fabric surface of the sluice-gate thus being allowed to buckle arbitrarily. As with the sluice design shown in FIG. 6a, sub-atmospheric pressure can be arranged in the tank 1, if additional tightness against the surrounding medium is desired. A suitable way is to ensure that the water level in the tank 1 is lower than in the sluice 31 and that the water level in the pool 2 is higher than in the sluice 31. An additional cleaning device 16 can possibly be arranged in the sluice 31 for continuous cleaning of this volume. The advantage of the design in FIG. 6b is that the sluice takes up little space since the sluice-gates 32a–b are turned downwards (upwards) instead of outwards/inwards. The sluice 31 can be detachably arranged at the tank 1 such that exchange of sluices 31 of different sizes can be made in a simple manner.

Figure 7:
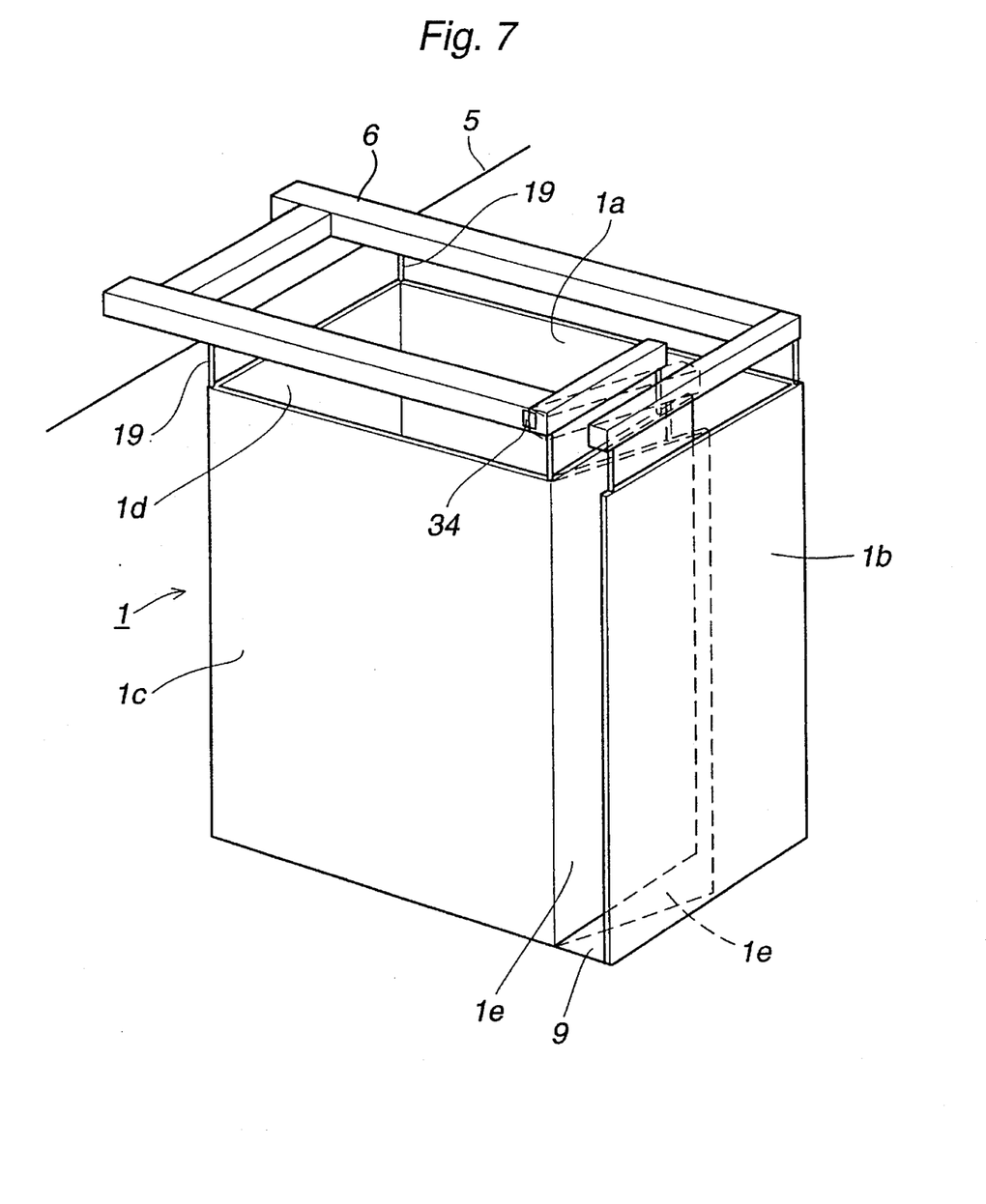
FIG. 7 schematically shows a volume delimitation tank with a square cross section where two wall portions overlap and where the inner one of these wall portions may slide against the outer one.

FIG. 7 shows a tank 1 with five wall sections 1a–e, two of the wall sections 1b and 1e being arranged at least partially to overlap, thus forming a flow passage where a small exchange of water between the water in the tank 1 and the water in the pool 2 is allowed. In those cases where cleaned water is continuously pumped out of the tank 1, such that sub-atmospheric pressure prevails, water will only flow into the tank via the passage, that is, contaminated water does not flow out into the pool 2 via the passage. This tank 1, as the one described in FIGS. 2–6, can be made of cloth, of fabric, or as a plate. In the cloth or fabric design, the walls 1a–e are allowed to buckle arbitrarily when the tank is dismantled. In those cases where the tank 1 is made as a plate, it is provided with fold notches 27, according to FIG. 5, such that the plate can be folded in suitably large sections. The tank 1 according to this embodiment can also be provided with hinges 34, allowing the inner wall section 1e to be turned out and fit tightly against the outer wall section 1b.

Figure 8:
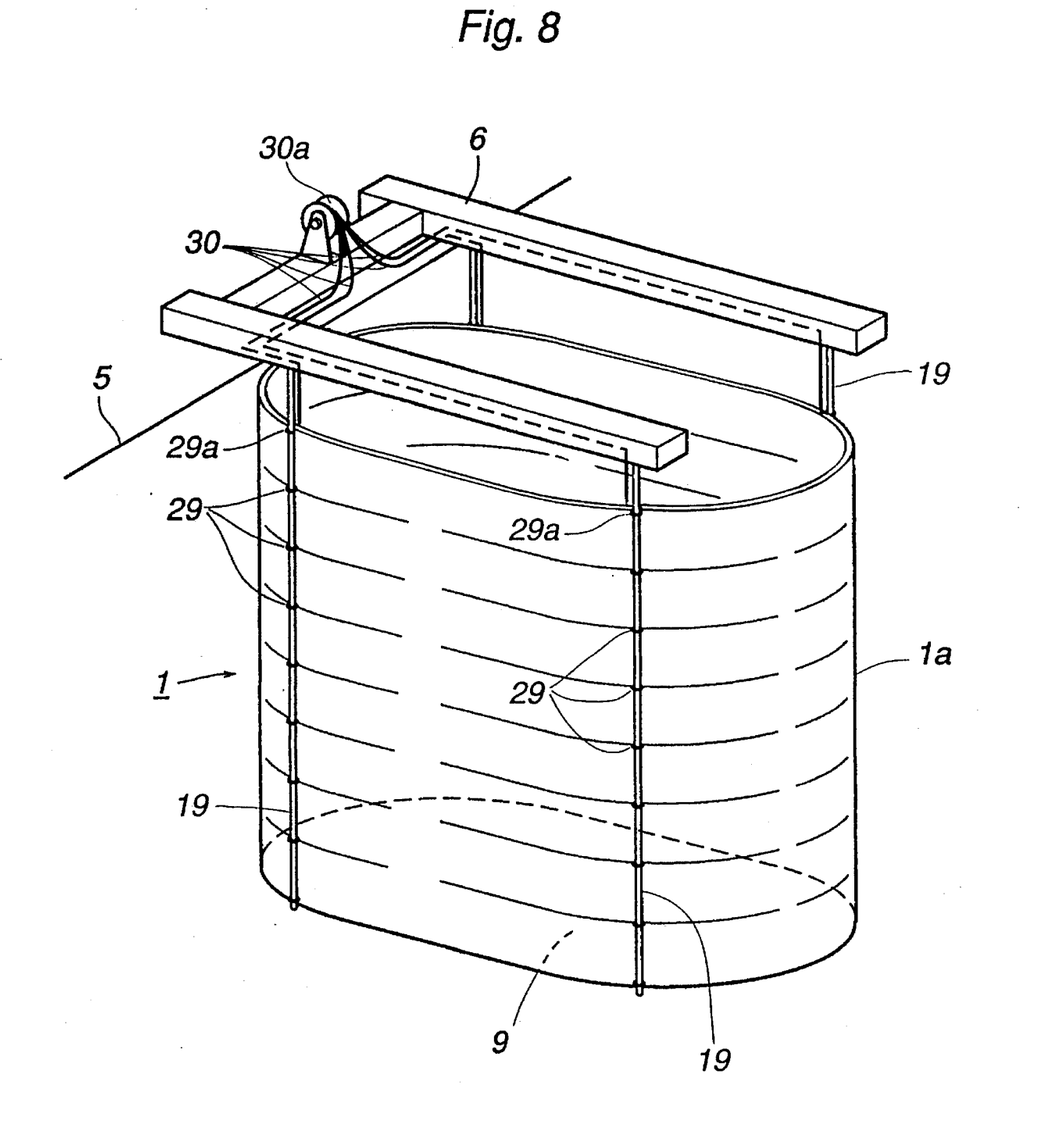
FIG. 8 schematically shows a volume delimitation tank with an oval cross section.

FIG. 8 shows a tank 1 made with an oval cross section. The tank 1 can also be made with a circular cross section. In both cases it can be designed with or without fold notch 27. The tank 1 is provided with support rods 19, around the vertical support rods 19 there being arranged loops 29, 29a for control of the raising and lowering of the wall 1a.

The concept fabric according to the above comprises the traditional way of manufacturing textile fabrics, where a two-thread system with crossing threads, warp and weft is used, but also manufacture by means of, for example, tricot technique or knitting with a single-thread system where a thread forms meshes with itself or with parallel-running threads, or manufacture by means of so-called nonwoven technique where the material is neither woven nor knitted but where loose fibres are bound together in the form of a pile with the aid of glue or chemicals.

We claim:

1. A device for volume delimitation when working with radioactively contaminated parts within the device, such as a control rod for a nuclear power plant for preventing contamination of a total volume of liquid medium surrounding the device and forming a pool, such as a nuclear reactor pool, said device comprising a transportable tank with a substantially horizontal bottom part and with substantial vertical side walls and an open top, means within the tank connectable with cleaning equipment for the cleaning of liquid medium delimited within the tank, wherein at least the side walls are foldable and are comprised of a material of synthetic fibers of a strength resistant to puncture, the material comprising polyethylene.

2. A device for volume delimitation when working with radioactively contaminated parts within the device, such as a control rod for a nuclear power plant, for preventing contamination of a total volume of liquid medium surrounding the device and forming a pool, such as a nuclear reactor pool, said device comprising a transportable tank with a substantially horizontal bottom part and with substantially vertical side walls and an open top, means within the tank connectable with cleaning equipment for the cleaning of liquid medium delimited within the tank, wherein at least the side walls are foldable and are comprised of a material of organic or synthetic fibers of a strength resistant to puncture, the material comprising at least one layer of fabric.

3. A device according to claim 2, wherein the material comprises a plurality of laminated fabric layers forming a stiff plate.

4. A device for volume delimitation when working with radioactively contaminated parts within the device, such as a control rod for a nuclear power plant, for preventing contamination of a total volume of liquid medium surrounding the device and forming a pool, such as a nuclear reactor pool, said device comprising a transportable tank with a substantially horizontal bottom part and with substantially vertical side walls and an open top, means within the tank connectable with cleaning equipment for the cleaning of liquid medium delimited within the tank, wherein at least the side walls are foldable and are comprised of a material of organic or synthetic fibers of a strength resistant to puncture, the material comprising at least one layer of cloth.

5. A device according to claim 4, wherein the material comprises a plurality of laminated cloth layers forming a stiff plate.

6. A device according to claims 1, 2 or 4, wherein the side walls of the tank have fold notches.

7. A device according to claims 1, 2 or 4 wherein the side walls of the tank comprise channels detachably mounted to the bottom part.

8. A device according to claims 1, 2 or 4, wherein the side walls of the tank are formed of a sack which is detachably mounted to the bottom part.

9. A device according to claims 1, 2 or 4, wherein the bottom part is made as a part integral with the side walls.

10. A device according to claims 1, 2 or 4 wherein a gas hood is arranged in the tank for exhaustion of gas evolved during the work.

11. A device according to claims 1, 2 or 4, wherein the bottom part is of stainless steel.

12. A device according to claims 1, 2 or 4, where in the bottom part is made of aluminum.

13. A device according to claims 1, 2 or 4, wherein support rods capable of being dismantled are arranged to support the side walls in at least the vertical direction, said support walls being of the same material as the side walls.

14. A device according to claims 1, 2 or 4, wherein support rods capable of being dismantled are arranged to support the side walls in at least the vertical direction, said support rods being of aluminum.

15. A device according to claims 1, 2 or 4, wherein the tank is provided with a sluice for passing objects in and out, whereby only a small liquid volume need be cleaned between each transport.

16. A device according to claims 1, 2 or 4, wherein at least one section of the side walls is separately raisable and lowerable for passing objects in and out.

17. A device according to claims 1, 2 or 4, wherein at least two wall sections, one inner and one outer, are arranged to overlap each other, forming a flow passage between the reactor pool and the interior of the tank.

18. A device according to claim 21, wherein the inner wall section can be pushed against the outer wall section for sealing the flow passage.

19. A device according to claim 1, 2 or 4, wherein at least said side walls are combustible.

20. A device for volume delimitation when working with radioactively contaminated parts within the device, such as a control rod for a nuclear power plant, for preventing contamination of a total volume of liquid medium surrounding the device and forming a pool, such as a nuclear reactor pool, said device comprising a transportable tank with a substantially horizontal bottom part and with substantially vertical side walls and an open top, means within the tank connectable with cleaning equipment for the cleaning of liquid medium delimited within the tank, wherein at least the side walls are foldable and are comprised of a material of organic or synthetic fibers of a strength resistant to puncture, and a stand for separated scrap being arranged in the tank.

21. A device for volume delimitation when working with radioactively contaminated parts within the device, such as a control rod for a nuclear power plant, for preventing contamination of a total volume of liquid medium surrounding the device and forming a pool, such as a nuclear reactor pool, said device comprising a transportable tank with a substantially horizontal bottom part and with substantially vertical side walls and an open top, means within the tank for cleaning liquid medium delimited within the tank, wherein at least the side walls are foldable and are comprised of a material of organic or synthetic fibers of a strength resistant to puncture, and the tank having a water transmitting inner sack.

* * * * *